United States Patent [19]
Maver et al.

[11] Patent Number: 6,040,368
[45] Date of Patent: Mar. 21, 2000

[54] AQUEOUS COATING COMPOSITIONS WITH EXTENDED OPEN TIME

[75] Inventors: Tammy Lynne Maver, Moorestown, N.J.; Robert Krasnansky, LeRouret, France

[73] Assignee: Rohm and Haas Company, Philadelphia, Pa.

[21] Appl. No.: 09/195,373

[22] Filed: Nov. 18, 1998

[51] Int. Cl.[7] ....................................... C08K 5/15
[52] U.S. Cl. .............................................. 524/110
[58] Field of Search ...................... 524/501, 110

[56] References Cited

U.S. PATENT DOCUMENTS

| | | |
|---|---|---|
| 5,071,903 | 12/1991 | Farmer et al. . |
| 5,176,750 | 1/1993 | Kammer .................. 106/496 |
| 5,270,380 | 12/1993 | Adamson et al. . |
| 5,331,042 | 7/1994 | Charmot et al. . |
| 5,431,840 | 7/1995 | Soldanski et al. . |
| 5,523,335 | 6/1996 | Whyzmuzis et al. . |

FOREIGN PATENT DOCUMENTS

| | | |
|---|---|---|
| 2195918 | 2/1996 | Canada . |

*Primary Examiner*—Paul R. Michl
*Attorney, Agent, or Firm*—Ronald D. Bakule

[57] ABSTRACT

An aqueous coating composition having extended open time is provided. The aqueous coating composition includes an emulsion polymer, the polymer including a copolymerized ethylenically-unsaturated monomer having a pendant group selected from the group consisting of acetoacetate, acetoacetamide, cyanoacetate, and cyanoacetamide; a polyether monoamine or polyether diamine having primary or secondary amino functionality; and an alkyl polyglycoside. And a method for extending the open time of an aqueous coating composition by forming the composition and applying the composition to a substrate is also provided.

8 Claims, No Drawings

AQUEOUS COATING COMPOSITIONS WITH EXTENDED OPEN TIME

This invention relates to an aqueous coating composition having extended open time. More particularly, this invention relates to an aqueous coating composition including an emulsion polymer, the polymer including a copolymerized ethylenically-unsaturated monomer having a pendant group selected from the group consisting of acetoacetate, acetoacetamide, cyanoacetate, and cyanoacetamide; a polyether monoamine or polyether diamine having primary or secondary amino functionality; and an alkyl polyglycoside. And the invention relates to a method for extending the open time of an aqueous coating composition by forming the composition including an emulsion polymer, the polymer including a copolymerized ethylenically-unsaturated monomer having a pendant group selected from the group consisting of acetoacetate, acetoacetamide, cyanoacetate, and cyanoacetamide; a polyether monoamine or polyether diamine having primary or secondary amino functionality; and an alkyl polyglycoside and applying the composition to a substrate.

The present invention serves to provide a dried coating which is aesthetically pleasing by extending the open time of the aqueous coating composition. The "open time" of an aqueous coating composition herein is the time during which the aqueous coating composition remains workable. Because of the fast drying nature of aqueous coating compositions, there is often not enough time to re-brush or re-roll over the freshly coated wet surface to improve its surface appearance or to apply additional paint onto the freshly coated surface without causing such defects as brush marks, lap lines resulting from differences in paint thickness, and loss of gloss. "Extended open time" herein refers to the open time of a composition of this invention which is greater than that of the same emulsion polymer absent the polyether monoamine or polyether diamine having primary or secondary amino functionality and/or alkyl polyglycoside measured in the same way under the same conditions.

U.S. Pat. No. 5,270,380 discloses a method for extending the open time of an aqueous coating composition by providing a latex polymer with a first reactable group which reacts with a second reactable group in a modifying compound. Disclosed are latex polymers containing acetoacetate groups and modifying compounds including polyethoxylated monoamines or diamines. Further improvements in open time have been found desirable.

U.S. Pat. No. 5,523,335 discloses a flexible printing ink composition containing a water-dispersible polyacrylate resin binder which may be prepared using a nonionic dispersing agent such as the ethylene oxide condensate of long chain or branched chain mono-amines, pigment, and an alkyl polyglycoside surfactant. The open time of the flexible ink composition was not recognized as a relevant property or measured, nor were copolymerized ethylenically-unsaturated monomers having a pendant group selected from the group consisting of acetoacetate, acetoacetamide, cyanoacetate, and cyanoacetamide disclosed.

The problem faced by the inventors is the provision of a suitable composition and a method for extending the open time of a coating so that overlapping and perfecting brush strokes do not permanently disrupt the surface of the dried coating. Previous coating compositions were directed to solving this problem but further improvements were found desirable. We have now found that alkyl polygoycosides with selected emulsion polymer and amine compositions have been able to achieve improvements in open time.

In a first aspect of the present invention there is provided an aqueous coating composition having extended open time including an emulsion polymer, the polymer including a copolymerized ethylenically-unsaturated monomer having a pendant group selected from acetoacetate, acetoacetamide, cyanoacetate, and cyanoacetamide; a polyether monoamine or polyether diamine having primary or secondary amino functionality; and an alkyl polyglycoside.

In a second aspect of the present invention there is provided a method for extending the open time of an aqueous coating composition by forming the composition including an emulsion polymer, said polymer including a copolymerized ethylenically-unsaturated monomer having a pendant group selected from acetoacetate, acetoacetamide, cyanoacetate, and cyanoacetamide; a polyether monoamine or polyether diamine having primary or secondary amino functionality; and an alkyl polyglycoside and applying the composition to a substrate.

This invention relates to an aqueous coating composition having extended open time. The aqueous coating composition contains a waterborne emulsion polymer. The emulsion polymer contains at least one copolymerized ethylenically-unsaturated monomer having a pendant group selected from acetoacetate, acetoacetamide, cyanoacetate, and cyanoacetamide. Such monomers may be used in the formation of the polymer or by post-reaction of a copolymerized precursor monomer. In general, any polymerizable hydroxy- or amino-functional monomer can be converted to the corresponding acetoacetate or acetoacetamide, before or after polymerization, by reaction with diketene or other suitable acetoacetylating agent (See e.g. Comparison of Methods for the Preparation of Acetoacetylated Coating Resins, Witzeman, J. S.; Dell Nottingham, W.; Del Rector, F. J. Coatings Technology; Vol. 62, 1990, 101 (and references contained therein)). Cyanoacetates and cyanoacetamides may be prepared by methods known in the art as disclosed, for example, in U.S. Pat. Nos. 3,554,987: 3,658,878; and 5,021,511. Preferred is an emulsion polymer including from 1% to 25%, by weight, based on the total monomer weight, copolymerized ethylenically unsaturated monomer bearing acetoacetate functionality such as, for example, vinyl acetoacetate, acetoacetoxyethyl acrylate, acetoacetoxyethyl methacrylate (AAEM), acetoacetoxypropyl methacrylate (AAPM), allyl acetoacetate, acetoacetoxybutyl methacrylate, 2,3-di(acetoacetoxy) propyl methacrylate. More preferred is an emulsion polymer containing from 2% to 20%, by weight, based on the total monomer weight, copolymerized acetoacetoxyethyl methacrylate. The polymer may also contain other copolymerized ethylenically-unsaturated monomer(s) such as, for example, a (meth) acrylic ester monomer including methyl acrylate, ethyl acrylate, butyl acrylate, 2-ethylhexyl acrylate, decyl acrylate, methyl methacrylate, butyl methacrylate, hydroxyethyl methacrylate, hydroxypropyl methacrylate, aminoalkyl (meth)acrylate; styrene or substituted styrenes; butadiene; vinyl acetate or other vinyl esters; vinyl monomers such as vinyl chloride, vinylidene chloride, N-vinyl pyrollidone; (meth)acrylonitrile and (meth)acrylamide. The use of the term "(meth)" followed by another term such as acrylate or acrylamide, as used throughout the disclosure, refers to both acrylates and acrylamides and methacrylates and methacrylamides, respectively.

The waterborne polymer may also contain from 0% to 15%, preferably from 1% to 5%, of a copolymerized monoethylenically-unsaturated acid monomer, based on the dry weight of the polymer, such as, for example, acrylic acid, methacrylic acid, crotonic acid, itaconic acid, sulfoethyl methacrylate, phosphoroethyl methacrylate, fumaric acid, maleic acid, monomethyl itaconate, monomethyl fumarate, monobutyl fumarate, and maleic anhydride.

The waterborne polymer used in this invention is substantially thermoplastic, or substantially uncrosslinked, when it is applied to the substrate, although low levels of deliberate or adventitious crosslinking may be present. When low levels of precrosslinking or gel content are desired low levels of multi-ethylenically unsaturated monomers such as, for example, 0.1%–5%, by weight based on the weight of the emulsion-polymerized polymer, allyl methacrylate, diallyl phthalate, 1,3-butylene glycol dimethacrylate, 1,6-hexanedioldiacrylate, and divinyl benzene may be used. It is important, however, that the quality of the film formation is not materially impaired. Chain transfer agents such as, for example, alkyl mercaptans may be used in order to moderate the molecular weight of the polymer.

The polymerization techniques used to prepare waterborne polymers such as, for example, emulsion polymers, aqueous colloidal polymeric dispersions, solution polymers dissolved in water or in a predominantly aqueous medium, and aqueous polymer suspensions are well known in the art. Emulsion polymers are preferred. In the preparation of emulsion polymers conventional surfactants may be used such as, for example, anionic and/or nonionic emulsifiers such as alkali or ammonium alkyl sulfates, alkyl sulfonic acids, fatty acids, and oxyethylated alkyl phenols. The amount of surfactant used is usually up to 6% by weight, based on the weight of total monomer. Either thermal or redox initiation processes may be used. Conventional free radical initiators may be used such as, for example, hydrogen peroxide, t-butyl hydroperoxide, and ammonium and/or alkali persulfates, typically at a level of 0.05% to 3.0% by weight, based on the weight of total monomer. Redox systems using the same initiators coupled with a suitable reductant such as, for example, sodium bisulfite may be used at similar levels.

In another aspect of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactant, chain transfer agents, etc. as disclosed herein-above for the emulsion polymer. The polymerization techniques used to prepare such multistage emulsion polymers are well known in the art such as, for example, U.S. Pat. Nos. 4,325,856; 4,654,397; and 4,814, 373.

The emulsion polymer typically has an average particle diameter of 30 nanometers to 500 nanometers. Processes yielding polymodal particle size distributions such as those disclosed in U.S. Pat. Nos. 4,384,056 and 4,539,361, for example, may also be employed.

The glass transition temperature ("Tg") of the emulsion polymer is preferably from −10° C. to 70° C., as measured by differential scanning calorimetry (DSC) using the midpoint in the heat flow versus temperature transition as the Tg value.

The aqueous coating composition contains a polyether monoamine or polyether diamine having primary or secondary amino functionality such as an mono or diaminoterminated polyethyleneglycol. The polyether monoamines or diamines contain at least 8 oxyalkylene groups which may be the same or different; the monoamine is either a primary or a secondary amine and the diamine has two amine groups independently selected from primary amine and secondary amine. A preferred polyether monamine has a structure of R1—(CH2CH(R2)O)n—CH2CH(R3)—NH2 where R1 is selected from C1–C12 alkyl and where R2 and R3 are independently selected from H and C1–C3 alkyl. Preferred is R2=methyl. A preferred polyether monoamine is JEFFAMINE® M-1000 (now XTJ-506) (JEFFAMINE® is a trademark of Huntsman Chemical Co.) which is reported to have the structure R—(CH2CH(R')—CH2CH(CH3)—NH2 with a mole ratio of propylene oxide/ethylene oxide constituents of 3/19 and an approximate molecular weight of 1,000 and which is made by the reaction of a monohydric alcohol initiator with alkylene oxide, followed by conversion of the resulting terminal hydroxyl group to an amine. The polyether diamines may have a structure of H(R3)N—(OCH2CH(R5))x—N(R4)H, where R3 and R4 may be the same or different and are independently selected from Hydrogen and C1–C6 alkyl and R5 is selected from C2–C3 alkyl or they may contain alkyleneoxy. Preferred is R3=R4= H, R5=methyl, and x=10–50. A preferred polyether diamine is JEFFAMINE® ED-600 (now XTJ-500) which is reported to have the structure H2NCH(CH3)CH2—[OCH(CH3) CH2]a—{OCH2CH2]b—[OCH2CH(CH3)]c—NH2, where b is approximately 5.5, a+c=2.5 and the approximate molecular weight is 600. Primary or secondary amino groups are capable of reacting with functional groups on the polymer emulsion such as, for example, acetoacetate groups, to form enamine structures. More preferred are polyetherdiamines as they may engender crosslinking which may improve coating properties other than open time. Preferred is a level of polyether monoamine or polyether diamine such that the number of equivalents of amino groups is from 0.1 to 1.1, based on equivalents of acetoacetate, acetoacetamide, cyanoacetate, and cyanoacetamide groups. Preferred is a level of polyether monoamine or polyether diamine such that the number of equivalents of amino groups is from 0.2 to 0.6, based on equivalents of acetoacetate, acetoacetamide, cyanoacetate, and cyanoacetamide groups The aqueous coating composition contains an alkyl polyglycoside by which is meant herein an alkyl polyglycoside of C8–C18 alcohols and reducing sugars, in which one sugar chain containing on average from 1 to 10 sugar residues attached to one another by glycoside bonds is present for every alkyl group. The alkyl polyglycosides may be prepared by the process disclosed in U.S. Pat. No. 3,839,318 beginning with glucose or oligosaccharides and C8–C18 alcohols which may be reacted at 80–130° C. in the presence of an acidic catalyst such as, for example, sulfuric acid. The alkyl polyglycosides are surfactants and may be used as sole or co-surfactants in the preparation of the emulsion polymer or post-added during or after the formation of the emulsion polymer. Preferred alkylpolyglycosides are GLUCOPON™ 225 (GLUCOPON™ is a trademark of Henkel Corporation) with an average alkyl chain length reported to be 9.1 and GLUCOPON™ 625 with an average alkyl chain length reported to be 12.8. Preferred is a composition containing 0.1% to 10% alkyl polyglycoside, by wt. based on polymer weight. More preferred is a composition containing 1% to 7% alkyl polyglycoside, by wt. based on polymer weight.

The amount of pigment in the aqueous coating composition may vary from a pigment volume concentration (PVC) of 0 to 75 and thereby encompass coatings otherwise described, for example, as clear coatings, semi-gloss or gloss coatings, flat coatings, and primers.

The aqueous coating composition is prepared by techniques which are well known in the coatings art. First, if the coating composition is to be pigmented, at least one pigment is well dispersed in an aqueous medium under high shear such as is afforded by a COWLES® mixer or, in the alternative, at least one predispersed pigment may be used. Then the emulsion polymer is added under low shear stirring along with other coatings adjuvants as desired. Alternatively, the emulsion polymer may be present during the pigment dispersion step. The aqueous coating composition may contain conventional coatings adjuvants such as, for example, emulsifiers, buffers, neutralizers, coalescents, thickeners or rheology modifiers, freeze-thaw additives, wet-edge aids, humectants, wetting agents, biocides, antifoaming agents, colorants, waxes, and anti-oxidants.

The solids content of the aqueous coating composition may be from 25% to 60% by volume. The viscosity of the aqueous polymeric composition may be from 50 KU (Krebs Units) to 100 KU as measured using a Brookfield Digital viscometer KU-1; the viscosities appropriate for different application methods vary considerably.

Conventional coatings application methods such as, for example, brushing, rolling, and spraying methods such as, for example, air-atomized spray, air-assisted spray, airless spray, high volume low pressure spray, and air-assisted airless spray may be used. The aqueous coating composition may be applied to substrates such as, for example, wood, metal, plastics, cementitious substrates such as, for example, concrete, stucco, and mortar, previously painted or primed surfaces, and weathered surfaces. Drying is typically allowed to proceed under ambient conditions such as, for example, at 0° C. to 35° C.

The following examples are presented to illustrate the invention and the results obtained by the test procedures.

EXAMPLE 1

Preparation of Aqueous Coating Composition

To a 5-liter 4-neck round bottom flask equipped with a paddle stirrer, heating mantle and temperature controller, condenser and a nitrogen atmosphere was charged 1200 g of water and 2 g of sodium lauryl sulfate. The ingredients were heated to 85° C. A monomer emulsion of 700 g water, 20 g sodium lauryl sulfate, 800 g butyl acrylate, 960 g methyl methacrylate, 200 g 2-(acetoacetoxy)ethyl methacrylate, 40 g methacrylic acid, and 10 g of 1-dodecanethiol was prepared. Next, a solution of 3 g sodium carbonate and 20 g water, 25 g seed charge from the monomer emulsion, and a solution of 6 g ammonium persulfate and 20 g water was added to the flask. The ingredients were stirred for 10 minutes at 85° C. The monomer emulsion and a solution of 1 g ammonium persulfate and 100 g water was added into the system continuously over 180 minutes. At the end of feed alkyl polyglycoside was added over 20 minutes and stirred for an additional 20 minutes. The entire mixture was cooled to 60° C. and 5 g (0.15% by wt.) of a ferrous sulfate heptahydrate, 1 g t-butyl hydroperoxide and 10 g water, and 0.5 g sodium sulfoxylate in 20 g water was added to the mixture and stirred for 30 minutes. While cooling 11 g of ammonium hydroxide (28% by wt.) was added. The batch was cooled and filtered. The amine, first diluted to 50%, by weight, in water was then added with stirring.

TABLE 1-1

Aqueous Coating Compositions (CC)

| Sample No. | Alkyl polyglycoside | Alkyl polyglycoside (% by wt. based on polymer) | Amine | Amine Amount (Equivalents based on AAEM equiv.) |
|---|---|---|---|---|
| CC-1 | Glucopon™ 625 (37%) | 2 | Jeffamine® ED-600 | 0.2 |
| CC-2 | Glucopon™ 625 (37%) | 2 | Jeffamine® ED-600 | 0.6 |
| CC-3 | Glucopon™ 625 (37%) | 6 | Jeffamine® ED-600 | 0.2 |
| CC-4 | Glucopon™ 625 (37%) | 6 | Jeffamine® ED-600 | 0.6 |
| CC-5 | Glucopon™ 625 (37%) | 4 | Jeffamine® ED-600 | 0.4 |
| CC-6 | Glucopon™ 625 (37%) | 4 | Jeffamine® M-1000 | 0.4 |
| Comp. A | Glucopon™ 625 (37%) | 4 | No Amine | 0.0 |
| Comp. B | None | 0 | Jeffamine® ED-600 | 0.4 |
| Comp. C | None | 0 | No Amine | 0.0 |
| Comp. D | None | 0 | Diethylenetriamine | 0.4 |
| Comp. E | None | 0 | 1,6-Hexanediamine | 0.4 |
| Comp. F | None | 0 | Jeffamine® M-1000 | 0.4 |
| Comp. G | Glucopon™ 625 (37%) | 4 | Diethylenetriamine | 0.4 |
| Comp. H | Glucopon™ 625 (37%) | 4 | 1,6-Hexanediamine | 0.4 |
| Comp. I | Glucopon™ 220 (37%) | 4 | No Amine | 0.0 |
| Comp. J | Glucopon™ 220 (37%) | 4 | Diethylenetriamine | 0.4 |
| Comp. K | Glucopon™ 220 (37%) | 4 | 1,6-Hexanediamine | 0.4 |
| CC-7 | Glucopon™ 220 (37%) | 4 | Jeffamine® ED-600 | 0.4 |
| CC-8 | Glucopon™ 625 (37%) | 4 | Jeffamine® ED-600 | 0.4 |

CC-9 is a repeat of Sample CC-8 with one modification. Glucopon™ 625 was added during the preparation of the emulsion polymer after the addition of the ammonium hydroxide at 40° C.

Comp. L is a repeat of Sample CC-8 with an emulsion polymer composition consisting of 920 g butyl acrylate, 1040 g methyl methacrylate, 40 g methacrylic acid, 10 g 1-dodecanethiol [no 2-(acetoacetoxy)ethyl methacrylate].

CC-10 is a repeat of Sample CC-8 with an emulsion polymer composition consisting of 820 g butyl acrylate, 940 g styrene, 40 g methacrylic acid, 200 g 2-(acetoacetoxy) ethyl methacrylate, 10 g 1-dodecanethiol. (no methyl methacrylate).

Coating compositions were incorporated into a test formulation as presented in Table 1-1.

TABLE 1-1

Test Formulation

| MATERIAL | Grams |
|---|---|
| GRIND | |
| Methyl Carbitol | 6.3 |
| Tego FOAMEX ® 800 | 1.0 |
| Propylene Glycol | 33.8 |
| TAMOL ® 731 (25%) | 8.2 |
| TiPure ® R706 | 205.4 |
| Grind the above 15–20 min then add at lower speed | |
| Water | 20.0 |
| LETDOWN | |
| Coating Composition | 552.4 |
| Methyl Carbitol | 5.0 |
| TEXANOL ® | 32.0 |
| ACRYSOL ® RM-2020 | 90.0 |
| Water | 71.6 |
| PVC | 17.9 |
| Volume Solids | 34.4% |

Notes: TiPure ® is a trademark of EI DuPont de Nemours Co. TEXANOL ® is a trademark of Eastman Chemical Co. FOAMEX ® is a trademark of Tego Chemie Service USA, a Division of Goldschmidt Chemical Corporation. TAMOL ® and ACRYSOL ® are trademarks of Rohm and Haas Co.

EXAMPLE 2

Evaluation of Open Time of Coatings Compositions

The open time method measured the non-uniformity of a brushout presented by too rapid drying or tearing of the original coat, which is aesthetically undesirable, by measuring the gloss and flow of a brush-out after the film was repaired following 5 and 10 minutes of drying. The coating composition, each in the test formulation of Table 1-1, was applied with a 2 inch tapered Nylon brush at the natural spread rate of the coating composition (6–16 sq. meters per liter) to a Leneta Spreading Rate Chart (12H) (from The Leneta Company, Mahwah, N.J.) under conditions of 25° C.(77° F.)/50% Relative Humidity, conditions maintained throughout the test. The timer was begun following the application of the paint. After five minutes dry time, using the same brush (not cleaned prior to this step), the brush was re-wet with a small amount of the coating composition and brushed back into the entire length of the brushout chart along the left hand side. The above procedure was repeated for the right hand side after 10 minutes dry time, using the same brush (not cleaned prior to this step). The coated chart was allowed to dry overnight. Gloss at 20 degrees was measured using a Byk-Gardner Haze-Gloss Meter over each of the brushout areas: original, 5 and 10 minutes. Flow was rated over each of the brushout areas-original, 5 and 10 minutes-according to ASTM Method D-4062-88. A flow rating of 10 indicates a perfectly visually smooth surface; a rating of 7–10 is most desirable; a rating of 5 or less is unacceptable. Extended open time is related to minimal change in flow and gloss after disturbing the paint film during the drying process, that is, in this test, no or minimal change in the flow rating and gloss at 5 and 10 minutes compared to the original rating, with all at acceptable levels. Particularly critical is the flow reading after 10 minute dry time. A difference of 1 unit is considered significant within each series.

TABLE 2-1

Effect of alkyl polyglycoside and diethylene triamine

| Coating Composition | Alkyl polyglycoside (Glucopon ™ 625) Level | Diethylene Triamine Level | Flow (0, 5 and 10 minutes) | 20 degree gloss (0, 5 and 10 minutes) |
|---|---|---|---|---|
| Comp. C | 0 | 0.0 eq. | 7/5/3 | 16/10/8 |
| Comp. D | 0 | 0.4 eq. | 5/3/2 | 8/5/6 |
| Comp. A | 4% | 0.0 eq. | 7/3/3 | 61/44/35 |
| Comp. G | 4% | 0.4 eq. | 8+/4/2 | 45/29/29 |

TABLE 2-2

Effect of alkyl polyglycoside and hexaethylene diamine

| Coating Composition | Alkyl Polyglycoside (Glucopon ™ 625) Level | Hexaethylene Diamine Level | Flow (0, 5 and 10 minutes) | 20 degree gloss (0, 5 and 10 minutes) |
|---|---|---|---|---|
| Comp. C | 0 | 0.0 eq. | 7/5/3 | 16/10/8 |
| Comp. E | 0 | 0.4 eq. | 6/3/2 | 13/7/5 |
| Comp. A | 4% | 0.0 eq. | 7/3/3 | 61/44/35 |
| Comp. H | 4% | 0.4 eq. | 8/3/2 | 37/31/28 |

TABLE 2-3

Effect of alkyl polyglycoside and polyether diamine

| Coating Composition | Alkyl Polyglycoside (Glucopon ™ 625) Level | Polyether Diamine (Jeffamine ® ED-600) | Flow (0, 5 and 10 minutes) | 20 degree gloss (0, 5 and 10 minutes) |
|---|---|---|---|---|
| Comp. C | 0 | 0.0 eq. | 7/5/3 | 16/10/8 |
| Comp. B | 0 | 0.4 eq. | 5/3/2 | 5/3/2 |
| Comp. A | 4% | 0.0 eq. | 7/3/3 | 61/44/35 |
| CC-8 | 4% | 0.4 eq. | 8/6/6 | 48/32/40 |

TABLE 2-4

Effect of alkyl polyglycoside and polyether diamine

| Coating Composition | Alkyl Polyglycoside (Glucopon ™ 625) Level | Polyether Diamine (Jeffamine ® ED-600) | Flow (0, 5 and 10 minutes) | 20 degree gloss (0, 5 and 10 minutes) |
|---|---|---|---|---|
| Comp. C | 0 | 0.0 eq. | 7/4/2 | 47/36/18 |
| Comp. B | 0 | 0.4 eq. | 8+/6/4 | 42/32/24 |
| Comp. A | 4% | 0.0 eq. | 10/8/7 | 49/44/32 |
| CC-5 | 4% | 0.4 eq. | 10/10–/9 | 51/49/52 |

TABLE 2-5

Effect of alkyl polyglycoside and polyether monoamine

| Coating Composition | Alkyl Polyglycoside (Glucopon ™ 625) Level | Polyether Diamine (Jeffamine ® M-1000) | Flow (0, 5 and 10 minutes) | 20 degree gloss (0, 5 and 10 minutes) |
|---|---|---|---|---|
| Comp. C | 0 | 0.0 eq. | 7/4/2 | 47/36/18 |
| Comp. F | 0 | 0.4 eq. | 9/7+/6 | 50/50/44 |
| Comp. A | 4% | 0.0 eq. | 10/8/7 | 49/44/32 |
| CC-6 | 4% | 0.4 eq. | 8/8/7 | 51/56/41 |

TABLE 2-6

Effect of alkyl polyglycoside and diethylene triamine

| Coating Composition | Alkyl Polyglycoside (Glucopon ™ 220) Level | Diethylene Triamine Level | Flow (0, 5 and 10 minutes) | 20 degree gloss (0, 5 and 10 minutes) |
|---|---|---|---|---|
| Comp. C | 0 | 0.0 eq. | 7/5/3 | 16/10/8 |
| Comp. D | 0 | 0.4 eq. | 5/3/2 | 8/5/6 |
| Comp. I | 4% | 0.0 eq. | 8+/7/2 | 51/52/17 |
| Comp. J | 4% | 0.4 eq. | 7/6/2 | 34/38/11 |

TABLE 2-7

Effect of alkyl polyglycoside and hexaethylene diamine

| Coating Composition | Alkyl Polyglycoside (Glucopon ™ 220) Level | Hexaethylene Diamine | Flow (0, 5 and 10 minutes) | 20 degree gloss (0, 5 and 10 minutes) |
|---|---|---|---|---|
| Comp. C | 0 | 0.0 eq. | 7/5/3 | 16/10/8 |
| Comp. E | 0 | 0.4 eq. | 6/3/2 | 13/7/5 |
| Comp. I | 4% | 0.0 eq. | 8+/7/2 | 51/52/17 |
| Comp. K | 4% | 0.4 eq. | 8/7/4 | 35/29/31 |

TABLE 2-8

Effect of alkyl polyglycoside and polyether diamine

| Coating Composition | Alkyl Polyglycoside (Glucopon ™ 220) Level | Polyether Diamine (Jeffamine ® ED-600) | Flow (0, 5 and 10 minutes) | 20 degree gloss (0, 5 and 10 minutes) |
|---|---|---|---|---|
| Comp. C | 0 | 0.0 eq. | 7/5/3 | 16/10/8 |
| Comp. B | 0 | 0.4 eq. | 5/3/2 | 35/23/13 |
| Comp. I | 4% | 0.0 eq. | 8+/7/2 | 51/52/17 |
| CC-7 | 4% | 0.4 eq. | 8/7/7 | 42/41/38 |

TABLE 2-9

Effect of alkyl polyglycoside and polyether diamine levels

| Coating Composition | Alkyl Polyglycoside (Glucopon ™ 625) Level | Polyether Diamine (Jeffamine ® ED-600) | Flow (0, 5 and 10 minutes) | 20 degree gloss (0, 5 and 10 minutes) |
|---|---|---|---|---|
| Comp. C | 0 | 0.0 eq. | 7/4/2 | 47/36/18 |
| Comp. B | 0 | 0.4 eq. | 8+/6/4 | 42/32/24 |
| Comp. A | 4% | 0.0 eq. | 10/8/7 | 49/44/32 |
| CC-1 | 2% | 0.2 eq. | 9/7/6 | 50/43/39 |
| CC-2 | 2% | 0.6 eq. | 10/9/8 | 30/33/29 |
| CC-3 | 6% | 0.2 eq. | 10/10−/10− | 20/24/24 |
| CC-4 | 6% | 0.6 eq. | 9/8−/8 | 52/55/53 |
| CC-5 | 4% | 0.4 eq. | 10/10−/9 | 51/49/52 |

TABLE 2-10

Effect of emulsion polymer process

| Coating Composition | Alkyl Polyglycoside (Glucopon ™ 625) Level | Polyether Diamine (Jeffamine ® ED-600) | Flow (0, 5 and 10 minutes) |
|---|---|---|---|
| CC-9 | 4% | 0.4 eq. | 7/6+/6 |
| CC-7 | 4% | 0.4 eq. | 8/6/6 |

TABLE 2-11

Effect of emulsion polymer backbone composition

| Coating Composition | Alkyl Polyglycoside (Glucopon ™ 625) Level | Polyether Diamine (Jeffamine ® ED-600) | Flow (0, 5 and 10 minutes) |
|---|---|---|---|
| CC-8 | 4% | 0.4 eq. | 8/6/6 |
| CC-10 | 4% | 0.4 eq. | 8/7/4 |

TABLE 2-12

Effect of emulsion polymer composition

| Coating Composition | Alkyl Polyglycoside (Glucopon ™ 625) Level | Polyether Diamine (Jeffamine ® ED-600) | Flow (0, 5 and 10 minutes) |
|---|---|---|---|
| CC-8 | 4% | 0.4 eq. | 8/6/6 |
| Comp. L | 4% | 0.4 eq. | 2/2/2 |

What is claimed is:

1. An aqueous coating composition having extended open time comprising an emulsion polymer, said polymer comprising a copolymerized ethylenically-unsaturated monomer having a pendant group selected from the group consisting of acetoacetate, acetoacetamide, cyanoacetate, and cyanoacetamide; a polyether monoamine or polyether diamine having primary or secondary amino functionality; and an alkyl polyglycoside.

2. The aqueous coating composition of claim 1 wherein said polymer comprises 1% to 25% copolymerized ethylenically unsaturated monomer bearing acetoacetate functionality, by weight based on total monomer weight.

3. The aqueous coating composition of claim 1 wherein said polymer comprises 2% to 20% copolymerized acetoacetoxyethyl methacrylate, by weight, based on total monomer weight.

4. The aqueous coating composition of claim 1 wherein said polyether monoamine or polyether diamine is a polyether diamine having from 0.1 to 1.1 equivalents of amino groups based on the equivalents of acetoacetate, acetoacetamide, cyanoacetate, and cyanoacetamide groups.

5. A method for extending the open time of an aqueous coating composition comprising forming said composition comprising an emulsion polymer, said polymer comprising a copolymerized ethylenically-unsaturated monomer having a pendant group selected from the group consisting of acetoacetate, acetoacetamide, cyanoacetate, and cyanoacetamide; a polyether monoamine or polyether diamine having primary or secondary amino functionality; and an alkyl polyglycoside and applying said composition to a substrate.

6. The method of claim 5 wherein said polymer comprises 1% to 25% copolymerized ethylenically unsaturated monomer bearing acetoacetate functionality, by weight based on total monomer weight.

7. The method of claim 5 wherein said polymer comprises 2% to 20% copolymerized acetoacetoxyethyl methacrylate, by weight, based on total monomer weight.

8. The method of claim 5 wherein said polyether monoamine or polyether diamine is a polyether diamine having from 0.1 to 1.1 equivalents of amino groups based on the equivalents of acetoacetate, acetoacetamide, cyanoacetate, and cyanoacetamide groups.

* * * * *